United States Patent [19]

Boyle

[11] Patent Number: 4,636,352

[45] Date of Patent: Jan. 13, 1987

[54] NUCLEAR FUEL ROD WITH BURNABLE PLATE AND PELLET-CLAD INTERACTION FIX

[75] Inventor: Raymond F. Boyle, Monroeville, Pa.

[73] Assignee: Westinghouse Electric Corp., Pittsburgh, Pa.

[21] Appl. No.: 578,336

[22] Filed: Feb. 9, 1984

[51] Int. Cl.⁴ ............................................. G21C 3/00
[52] U.S. Cl. .................... 376/419; 376/420; 376/421; 264/0.5; 252/638
[58] Field of Search ............... 376/419, 420, 414, 421, 376/422; 264/0.5; 252/638

[56] References Cited

U.S. PATENT DOCUMENTS

| | | | |
|---|---|---|---|
| 3,119,747 | 1/1964 | Wallace et al. | 176/171 |
| 3,334,019 | 8/1967 | Bogaardt | 376/419 |
| 3,872,022 | 3/1975 | De Hollander | 264/0.5 |
| 3,930,787 | 1/1976 | De Hollander | 264/0.5 |
| 4,052,330 | 10/1977 | Jensen | 264/0.5 |
| 4,100,020 | 7/1978 | Andrews | 176/68 |
| 4,285,769 | 8/1981 | Specker et al. | 176/30 |

FOREIGN PATENT DOCUMENTS 51-101689  9/1976  Japan .
55-135784 10/1980  Japan .

*Primary Examiner*—Donald P. Walsh
*Attorney, Agent, or Firm*—R. A. Stoltz

[57] ABSTRACT

An improved nuclear fuel rod comprising a tubular metallic cladding containing a plurality of nuclear fuel pellets has a plurality of ceramic wafers therein, each of which wafers being disposed between a major portion of adjacent fuel pellets. The ceramic wafers are formed from a sintered mixture of natural or depleted uranium dioxide and 1-8 percent by weight gadolinium oxide. The wafers are of a diameter substantially the same as that of the fuel pellets and have a thickness of between 10–100 mils. The wafers freeze out harmful fission products released by the fuel pellets and minimize or prevent pellet-clad interaction failures, while also providing flexibility in power shaping in the reactor system.

16 Claims, 1 Drawing Figure

U.S. Patent      Jan. 13, 1987      4,636,352
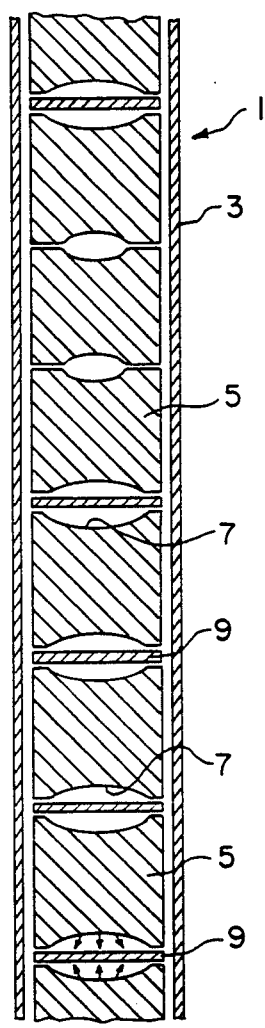

NUCLEAR FUEL ROD WITH BURNABLE PLATE AND PELLET-CLAD INTERACTION FIX

FIELD OF THE INVENTION

The present invention relates to an improved nuclear fuel rod with a burnable plate which will prevent corrosive attack of the rod cladding by fissile materials released during operation of a reactor employing the rods.

BACKGROUND OF THE INVENTION

It is well-known that the process of nuclear fission involves the disintegration of the fissionable fuel material, usually enriched uranium dioxide, into two or more fission products of lower mass number. Among other things, the process also includes a net increase in the number of available free neutrons which are the basis for a self-sustaining reaction. When a reactor has operated over a period of time the fuel assembly with fissionable material must ultimately be replaced due to depletion. Inasmuch as the process of replacement is time consuming and costly, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as "burnable absorbers" if they have a high probability (or cross-section) for absorbing neutrons while producing no new or additional neutrons or changing into new absorbers as a result of neutron absorption. During reactor operation the burnable absorbers are progressively reduced in amount so that there is a compensation made with respect to the concomitant reduction in the fissionable material.

The life of a fuel assembly may be extended by combining an initially larger amount of fissionable material as well as a calculated amount of burnable absorber. During the early stages of operation of such a fuel assembly, excessive neutrons are absorbed by the burnable absorber which undergoes transformation to elements of low neutron cross-section which do not substantially affect the reactivity of the fuel assembly in the latter period of its life when the availability of fissionable material is lower. The burnable absorber compensates for the larger amount of fissionable material during the early life of the fuel assembly, but progressively less absorber captures neutrons during the latter life of the fuel assembly, so that a long life at relatively constant fission level is assured for the fuel assembly. Accordingly, with a fuel assembly containing both fuel and burnable absorber in carefully proportioned quantity, an extended fuel assembly life can be achieved with relatively constant neutron production and reactivity.

The incorporation of burnable absorber in fuel assemblies has been recognized in the nuclear fuel as an effective means of increasing fuel capacity and thereby extending core life. Burnable absorbers are used either uniformly mixed with the fuel (i.e., distributed absorber) or are placed discretely as separate elements in the reactor, as separate burnable absorber rods, so arranged that they burn out or are depleted at about the same rate as the fuel. Thus, the net reactivity of the core is maintained relatively constant over the active life of the core.

Among the various burnable absorbers that have been mixed with fuel as a distributed absorber, gadolinium oxide has been found to be an excellent absorber due to its extremely high thermal absorption cross-section. Enriched uranium dioxide, with a high U-235 isotope content, and gadolinium oxide, as a mixture, has thus previously been used as nuclear fuel pellets.

The use of separate bodies or pellets of a burnable poison in conjunction with nuclear fuel pellets has also been proposed. In U.S. Pat. No. 3,334,019 for example, the use of poison plates containing boron or a boron compound, dysprosium or samarium, cadmium or europium, has been proposed, where these plates are disposed between fuel elements containing fissile material. The purpose of the interspersing of poison plates between the fuel elements is to control the tendency of the reactivity of a reactor to change during its life. Also, in U.S. Pat. No. 3,119,747, a fuel element is described wherein wafers of a burnable poison are disposed on either side of a fuel body, and cylinders of a moderator, such as graphite, are disposed between the wafers and the respective end fixtures for the fuel element.

As discussed above, during operation of the reactor, fissile materials are released from the fuel pellets. These released materials, which include volatile materials, cause a problem of stress corrosion and possible failure of the metallic tubular cladding. This phenomenon is generally described as "pellet-clad interaction" (PCI). The chemical reaction of the metallic tubing with volatile fissile materials such as iodine, cadmium, or other volatile elements, coupled with cladding operating stresses can produce stress corrosion cracking of the metallic cladding or tubing and eventual penetration of the wall of the tube. Attempts have been made to prevent such pellet-clad interaction, such as by coating the inside wall of the tubing with a protective coating, and co-extruding a pure zirconium barrier on the inner portion of the zircaloy tubular wall. Such procedures are objectionable because of the high costs associated therewith.

It is an object of the present invention to provide a nuclear fuel rod that is so constructed as to eliminate or minimize pellet-clad interaction.

It is another object of the present invention to provide a nuclear fuel rod that incorporates the eliminating or minimizing of pellet-clad interaction failures into a burnable poison concept.

BRIEF SUMMARY OF THE INVENTION

An improved nuclear fuel rod comprising a metallic tubular cladding containing a plurality of nuclear fuel pellets, contains a plurality of ceramic wafers that are a sintered mixture of a natural or depleted uranium dioxide and gadolinium oxide. The wafers are each disposed between a major portion of the adjacent fuel pellets and freeze out volatile fission products released by the fuel pellets and minimize or prevent pellet-clad interaction failures. The wafers have diameter substantially the same as the diameter of the fuel pellets and a thickness of about 10–100 mils. The gadolinium oxide is present in an amount of between 1–8 percent by weight of the mixture. The wafers are formed by mixing a natural or depleted uranium dioxide with the gadolinium oxide and sintering the mixture to form ceramic wafers.

BRIEF DESCRIPTION OF THE DRAWING

The drawing is a cross-sectional view of a nuclear fuel rod containing the ceramic wafers of the present invention.

DETAILED DESCRIPTION

The present invention provides a nuclear fuel rod which incorporates a pellet-clad interaction fix with a burnable poison concept.

As illustrated in FIG. 1, a nuclear fuel rod 1, comprises a metallic tubular cladding 3, which may be formed from known metal cladding materials such as zircaloy, the tube being closed at both ends, as is conventional, by closure means, not shown. Positioned within the metallic tubular cladding 3, are a plurality of nuclear fuel pellets 5. The nuclear fuel pellets generally comprise sintered pellets of uranium dioxide that is enriched in the U-235 isotope. In place of the use of enriched uranium dioxide, a mixture of uranium-plutonium dioxide may be used. These fuel pellets are generally formed by enriching the uranium dioxide and either alone or in a mixture with plutonium dioxide, compacting the material to a desired size and shape and sintering the same to produce dense pellets for use in the nuclear fuel rod.

The nuclear fuel pellets will normally be of a length on the order of 0.4–0.6 inch, and have a length to diameter ratio of less than 1.7:1, and preferably of about 1.2:1. As formed, the nuclear fuel pellts have concavities 7, therein, to provide concave faces on the confronting faces of the pellets arranged in the tubular cladding in an axial relationship.

During the operation of a reactor containing the nuclear fuel, volatile fission products are released. Because such a release is generally temperature dependent, it has been found that the greatest release of such volatile fission products occurs at the concave faces of the fuel pellets, as indicated by the arrows shown in the drawing. Normally only a small amount of such volatile fission products are released from the sides of the fuel pellets directly confronting the wall of the metallic cladding. Thus, the present invention substantially reduces or eliminates attack on the cladding which could cause a pellet-clad interaction failure by freezing out the fission products released from the concave faces of the fuel pellets.

In order to freeze out the volatile fission products, and to also assist in controlling the power shaping of the reactor system, a plurality of ceramic wafers 9, are each axially disposed between a major portion of adjacent fuel pellets, the wafers being formed from gadolinium oxide and natural or depleted uranium dioxide.

The uranium dioxide used in the formation of the ceramic wafers 9 have no more uranium-235 isotope than is present in natural uranium dioxide. Generally, natural uranium dioxide will contain on the order of 0.71 percent by weight of the uranium-235 isotope. In the production of enriched uranium dioxide for use as a nuclear fuel, the same is processed so as to increase the uranium-235 isotope content. The scaling or residue from such processing is depleted uranium which contains an amount of uranium-235 isotope lower than that of the natural uranium, and can be essentially devoid of that isotope. It is this depleted uranium dioxide, or natural uranium dioxide which is usable in the formation of the ceramic wafers of the present invention.

The natural or depleted uranium dioxide has added thereto gadolinium oxide, and the mixture is sintered to form the ceramic wafers. The amount of gadolinium oxide added to the natural or depleted uranium dioxide is between about 1–8 percent by weight of the mixture. The ceramic wafers 9 so formed should have a diameter substantially the same as the diameter of the fuel pellets 5, as indicated in the drawings but will be of a much smaller length. The length of the wafers should be between about 10–100 mils. Wafers of less than 10 mils in thickness would be difficult to produce and could not retain an integral structure during handling and use, while wafers of a thickness of more than 100 mils would space the fuel pellets so far apart as to tend to cause problems relative to power peaking.

It is not necessary that a ceramic wafer 9 be disposed between all of the adjacent fuel pellets 5, but a major portion of the adjacent fuel pellets should have a wafer disposed therebetween. By varying the number of ceramic wafers present in the fuel rods, flexibility in the power shaping of the system is achieved. For example, a ceramic wafer could be disposed between each of adjacent fuel pellets in the zone of high power generation, generally the middle region of the rod, while adjacent fuel pellets at the end regions of the rods, or other areas of low power generation, would not have a ceramic wafer therebetween. Also, as an aid to power shaping of the system, particular wafers throughout the rod could vary in the amount of gadolinium oxide present, in the range of 1–8 percent by weight. The use of the present fuel rods, in addition to reducing or eliminating pellet-clad interaction failures, can thus eliminate the need for a burnable poison in the fuel pellets and eliminate the need for use of separate burnable poison rods in the reactor system.

In the present fuel rod, containing the ceramic wafers of natural or depleted uranium dioxide and gadolinium oxide, power generation from the ceramic wafers is very low and the wafers freeze out volatile fission products and prevent such fission products from reaching the cladding and causing pellet-clad interaction failures. After the gadolinium oxide has burned out, the natural or depleted uranium dioxide in the wafer is still low in power production, and will act to freeze out the harmful fission products.

What is claimed is:

1. In a nuclear fuel rod comprising a metallic tubular cladding containing a plurality of nuclear fuel pellets, said pellets containing enriched uranium-235, the improvement comprising:

a plurality of ceramic wafers, each wafer comprising a sintered mixture of gadolinium oxide and uranium dioxide, said uranium oxide having no more uranium-235 than is present in natural uranium dioxide, wherein each of said plurality of wafers is axially disposed between a major portion of adjacent said nuclear fuel pellets, whereby said wafers freeze out volatile fission products produced by said nuclear fuel and prevent interaction of said fission products with said metallic tubing cladding.

2. In a nuclear fuel rod as defined in claim 1, the improvement wherein said uranium dioxide comprises a naturally occurring uranium dioxide.

3. In a nuclear fuel rod as defined in claim 1, the improvement wherein said uranium dioxide comprises depleted uranium dioxide containing less uranium-235 than naturally occurring uranium dioxide.

4. In a nuclear fuel rod as defined in claim 3, the improvement wherein said depleted uranium dioxide is substantially devoid of the uranium-235 isotope.

5. In a nuclear fuel rod as defined in claim 1, the improvement wherein said wafer comprises between about 1–8 percent by weight gadolinium oxide.

6. In a nuclear fuel rod as defined in claim 1, the improvement wherein said wafer has a diameter substantially the same as said nuclear fuel pellets and a thickness of between about 10-100 mils.

7. In a nuclear fuel rod as defined in claim 1, the improvement wherein said nuclear fuel pellets are comprised of uranium dioxide, plutonium dioxide, and mixtures thereof.

8. In a nuclear fuel rod as defined in claim 1, the improvement wherein said adjacent nuclear fuel pellets have confronting concave faces.

9. In a nuclear fuel rod as defined in claim 1, the improvement wherein adjacent fuel pellets in the region of high power generation have a wafer therebetween, while no wafer is disposed between adjacent fuel pellets in areas of low power generation.

10. In a nuclear fuel rod as defined in claim 1 wherein a portion of said wafers contain a varying amount of gadolinium oxide relative to the amount of gadolinium oxide in other wafers of said plurality of wafers.

11. A wafer for use in a nuclear fuel rod, to freeze out volatile fission products produced by nuclear fuel pellets within said rod, comprising a sintered mixture for gadolinium oxide and uranium dioxide, said uranium dioxide having no more of the uranium-235 isotope than is present in natural uranium dioxide.

12. A wafer as defined in claim 11 wherein said uranium dioxide comprises a naturally occurring uranium dioxide.

13. A wafer as defined in claim 11, wherein said uranium dioxide comprises depleted uranium dioxide containing less uranium-235 isotope than naturally occurring uranium dioxide.

14. A wafer as defined in claim 13, wherein said depleted uranium dioxide is substantially devoid of the uranium-235 isotope.

15. A wafer as defined in claim 11, wherein said wafer comprises between about 1-8 percent by weight gadolinium oxide.

16. A wafer as defined in claim 11, wherein said wafer has a diameter substantially the same as the nuclear fuel pellets with which it is used, and a thickness of between about 10-100 mils.

* * * * *